United States Patent
Mahiddini

(10) Patent No.: US 9,652,314 B2
(45) Date of Patent: May 16, 2017

(54) DYNAMIC APPLICATION PROGRAMMING INTERFACE PUBLICATION FOR PROVIDING WEB SERVICES

(71) Applicant: Patrice Mahiddini, Hauts de Seine (FR)

(72) Inventor: Patrice Mahiddini, Hauts de Seine (FR)

(73) Assignee: Alcatel Lucent, Boulogne-Billancourt (FR)

( * ) Notice: Subject to any disclaimer, the term of this patent is extended or adjusted under 35 U.S.C. 154(b) by 597 days.

(21) Appl. No.: 13/651,607

(22) Filed: Oct. 15, 2012

(65) Prior Publication Data

US 2014/0109114 A1 Apr. 17, 2014

(51) Int. Cl.
| | |
|---|---|
| G06F 3/00 | (2006.01) |
| G06F 9/44 | (2006.01) |
| G06F 9/46 | (2006.01) |
| G06F 13/00 | (2006.01) |
| G06F 9/54 | (2006.01) |

(52) U.S. Cl.
CPC ........ G06F 9/547 (2013.01); *G06F 2209/462* (2013.01)

(58) Field of Classification Search
None
See application file for complete search history.

(56) References Cited

U.S. PATENT DOCUMENTS

| | | | | |
|---|---|---|---|---|
| 2004/0068586 | A1* | 4/2004 | Xie et al. | 709/246 |
| 2006/0004827 | A1* | 1/2006 | Stuart | G06F 9/4425 |
| 2010/0217782 | A1* | 8/2010 | Milligan et al. | 707/803 |
| 2010/0319002 | A1* | 12/2010 | Gosain et al. | 719/311 |
| 2011/0202933 | A1* | 8/2011 | Sherrill | 719/328 |

* cited by examiner

*Primary Examiner* — Craig Dorais

(74) *Attorney, Agent, or Firm* — Duft Bornsen & Fettig, LLP

(57) ABSTRACT

Systems and methods are disclosed for automatically generating and publishing API information for web services, and for informing a requestor for the web services of a correct format of the request. One embodiment comprises an API gateway that identifies a plurality of software code objects for deployment, where the code objects include executable code for performing functions. The API gateway receives a request for a web service from an application, queries a code object for usage information regarding a function to perform the web service, and determines that a format of the request for the web service is incorrect based on the query for the usage information. The API gateway transmits a response to the application that specifies a correct format of the web service request based on the query, and receives a subsequent request from the application that specifies the correct format for the web service request.

14 Claims, 5 Drawing Sheets

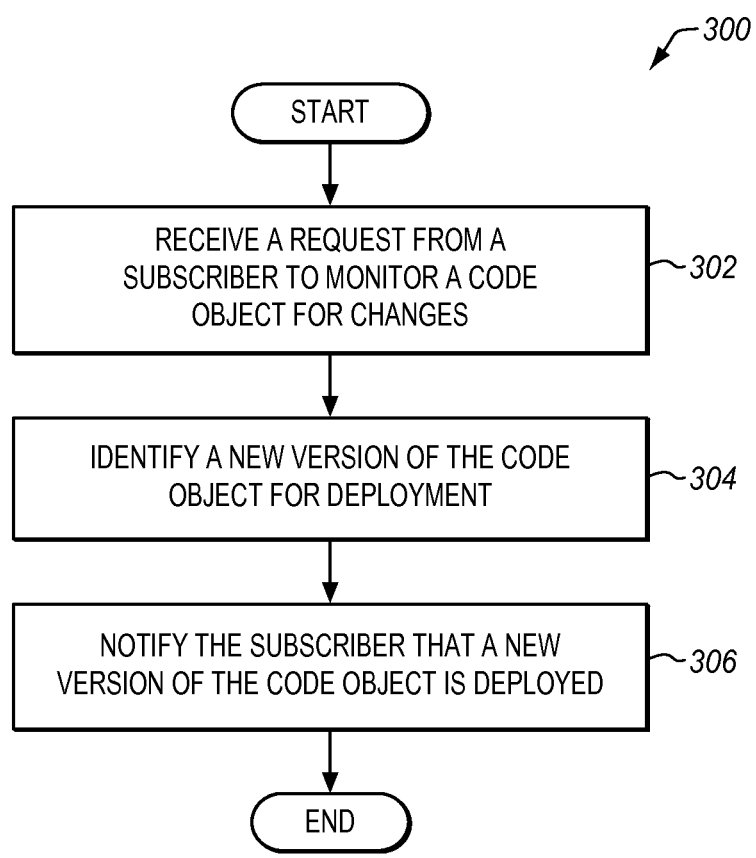

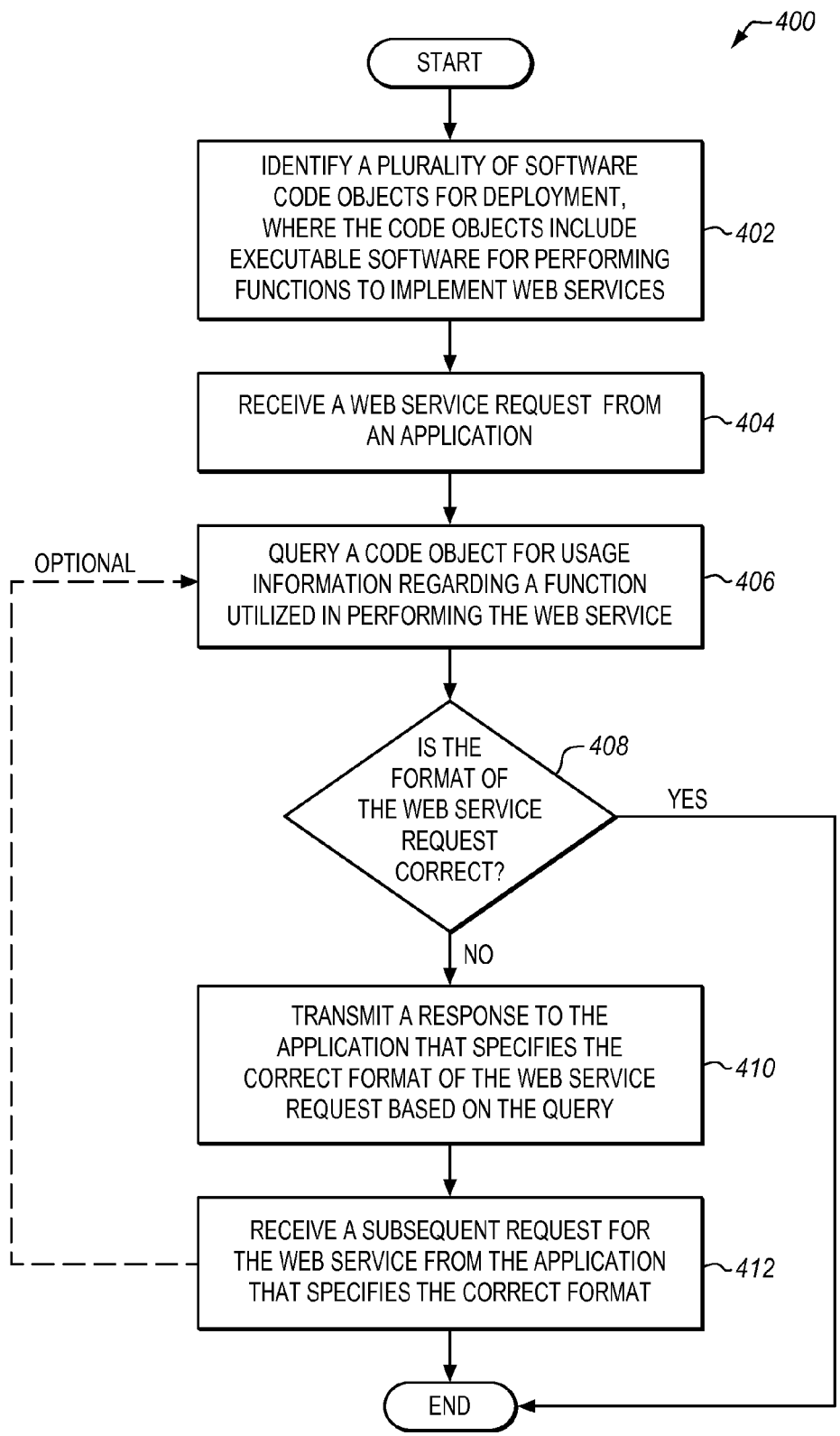

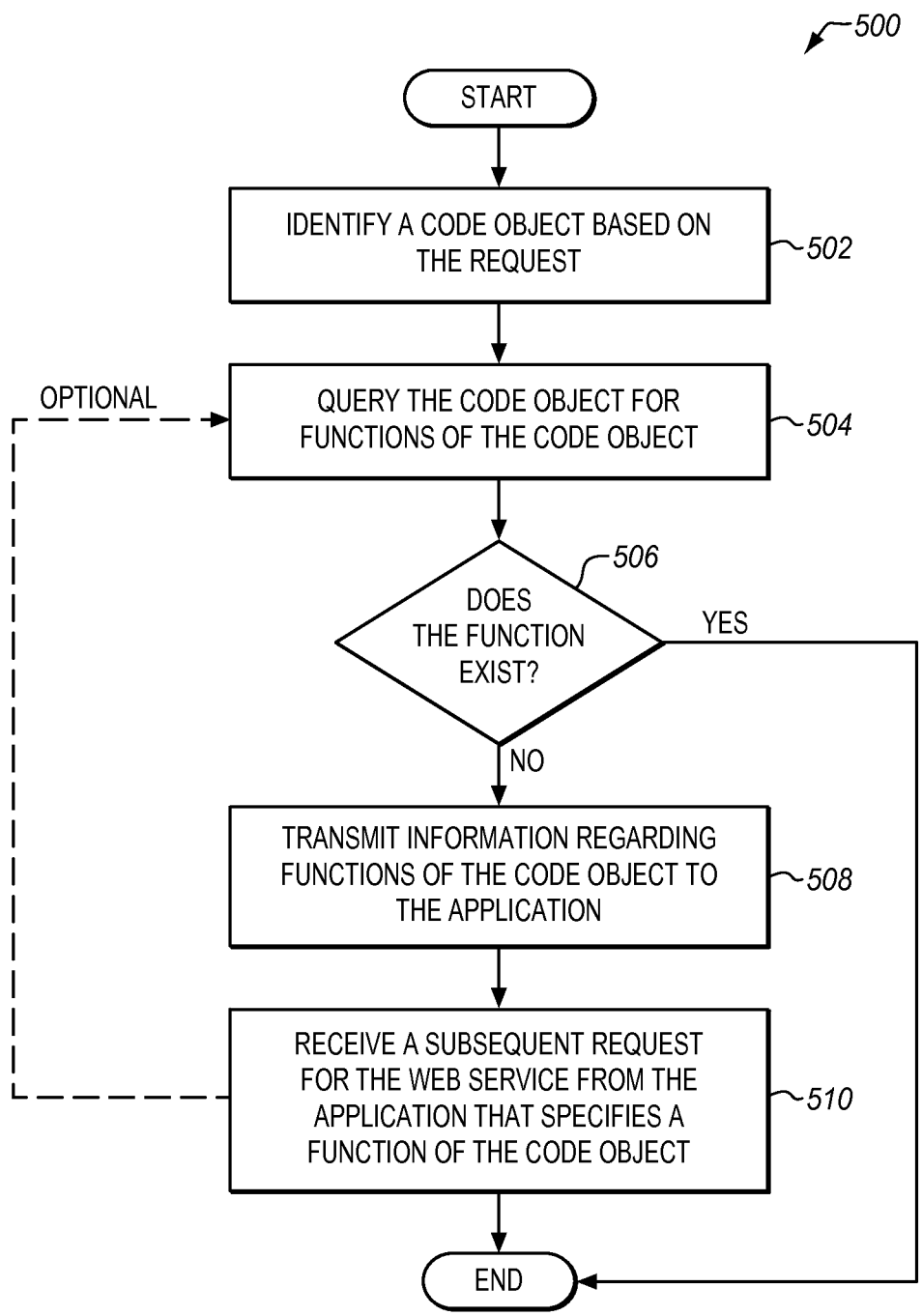

DYNAMIC APPLICATION PROGRAMMING INTERFACE PUBLICATION FOR PROVIDING WEB SERVICES

FIELD OF THE INVENTION

The invention is related to the field of deploying web services and, in particular, to providing enhanced publication and recovery services for systems that utilize web services.

BACKGROUND

An Application Programming Interface (API) is a specification that defines an interface for software components to communicate with each other. An API may include specifications for functions, data structures, object classes, and variables. Some examples of API specifications include the standard template library in C++, the Microsoft Windows API, libraries in C, and the Java API.

When an API specifies a function, the API provides information about how the function is called, what parameters are included in calling the function, and the format and type of data returned by the function. For example, an API may define a function "foo" as: int foo(int arg1, int arg2). In this example API, the function call foo takes two integer arguments (arg1 and arg 2), and returns an integer result. Using the function does not require knowledge of how the function is implemented as executable code. Rather, knowledge of the API specification may be all that is necessary. Further, the function may be executed by different system than the system issuing a function call for the function. Issuing function calls in this manner is referred to as a Remote Procedure Call (RPC). Generally, an RPC is an inter-process or inter-application communication that allows one computer system to cause a function to execute on another computer system.

One specific implementation of an RPC based API is a web service. A web service allows computer systems to communicate and interact with each other over the Internet. In particular, a web service may allow a computer system to request data processing and other services from remote computer systems utilizing Hypertext Transfer Protocol (HTPP) requests. One example of a web service is Google map web services. Google map web services include a number of publically accessible interfaces for map related services. For instance, the Google map street view interface lets a developer embed a street view for a particular location into a web page. A street view interface request is a HTTP Uniform Resource Locator (URL) having the following form: http://maps.googleapis.com/maps/api/streetview?parameters, where the parameters include the size of the image and the location of the street view to display.

Although API's such as Google's street view may provide significant value to developers, implementing new services using APIs may be difficult for smaller developers that do not have access to the resources of a company such as Google. Further, smaller developers typically make changes over time to APIs that make it difficult for systems utilizing the APIs to adapt accordingly.

SUMMARY

The embodiments described herein provide for automatically generating and publishing API information for web services, and dynamically informing an application issuing a request for the web services that the format of the request is incorrect. Determining the format of the request is incorrect is based on usage information queried from software code objects that implement the web service. When a request is received for a web service, code objects for implementing the web service are queried for information about how the code objects are used in order to determine if the format of web service request is incorrect. When the format of the request is incorrect, a response is sent to the application that includes information about the correct format of the web service request. This allows for the application to re-submit the web service request using the correct format for the request.

One embodiment comprises an Application Programming Interface (API) gateway configured to identify a software code object for deployment, wherein the code object includes executable code for performing at least one function to implement web services. The API gateway further configured to query the code object for the least one function, to automatically generate an API for mapping function calls for the at least one function to executable code for performing the at least one function, and to automatically publish a specification for the API of the at least one function to a system external to the API gateway.

Another embodiment comprises an Application Programming Interface (API) gateway configured to identify a plurality of software code objects for deployment, wherein the code objects include executable code for performing functions to implement web services. The API gateway is further configured to receive a request for a web service from an application, to query at least one code object for usage information regarding at least one function utilized in performing the web service, and to determine that a format of the web service request is incorrect based on the query for the usage information. The API gateway is further configured to transmit a response to the application that specifies a correct format of the web service request based on the query, and to receive a subsequent request for the web service from the application that specifies the correct format.

In another embodiment, the API gateway further configured to identify a code object for deployment, to query the code object for at least one function, to automatically generate an API for mapping function calls for the at least one function to executable code for performing the at least one function, and to automatically publish a specification for the API of the at least one function to a system external to the API gateway.

In another embodiment, the API gateway is further configured to identify a code object based on the web service request, to query the code object for functions of the code object, and to determine that a function specified in the web service request does not exist in the code object. The API gateway is further configured to transmit information regarding the functions of the code object to the application, and to receive a subsequent request for the web service from the application that specifies a function of the code object.

In another embodiment, the API gateway is further configured to identify a function for a code object based on the web service request, to query the code object for arguments of the function, and to determine that a format of the web service request is incorrect based on the query for the arguments of the function. The API gateway is further configured to transmit information regarding the arguments of the function to the application, and to receive the subsequent request for the web service from the application that specifies the arguments of the function.

In another embodiment, the API gateway is further configured to receive a request for information regarding functions of a code object from the application, to query the code object for functions of the code object, and to transmit information regarding the functions of the code object to the application.

In another embodiment, the API gateway is further configured to receive a request for information regarding arguments for the function from the application, to query the code object for arguments for the function, and to transmit information regarding the arguments for the function to the application.

In another embodiment, the API gateway is further configured to receive a subscriber request to monitor a code object for changes, to identify a new version of the code object for deployment, and to notify the subscriber that a new version of the code object is deployed.

In another embodiment, the API gateway is further configured to receive a request from a subscriber to monitor a category of web services that are available based on code objects deployed by the API gateway, to deploy a new code object for the category, and to notify the subscriber that a new code object for the category is deployed.

Another embodiment comprises a method of dynamically informing an application issuing a request for web services that the format of the request is incorrect. The method comprises identifying a plurality of software code objects for deployment, wherein the code objects include executable code for performing functions to implement web services. The method further comprises receiving a request for a web service from an application. The method further comprises querying at least one code object for usage information regarding at least one function utilized in performing the web service. The method further comprises determining that a format of the web service request is incorrect based on the query for the usage information. The method further comprises transmitting a response to the application that specifies a correct format of the web service request based on the query. The method further comprises receiving a subsequent request for the web service from the application that specifies the correct format.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

FIG. 3 is a flow chart illustrating a method of monitoring deployed software code objects for changes in an exemplary embodiment.

FIG. 4 is a flow chart illustrating a method of dynamically informing an application issuing a request for web services of a correct format of the request in an exemplary embodiment.

FIG. 5 is a flow chart illustrating additional details of the method of FIG. 4 for dynamically informing an application issuing a request for web services of a correct format of the request in an exemplary embodiment.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
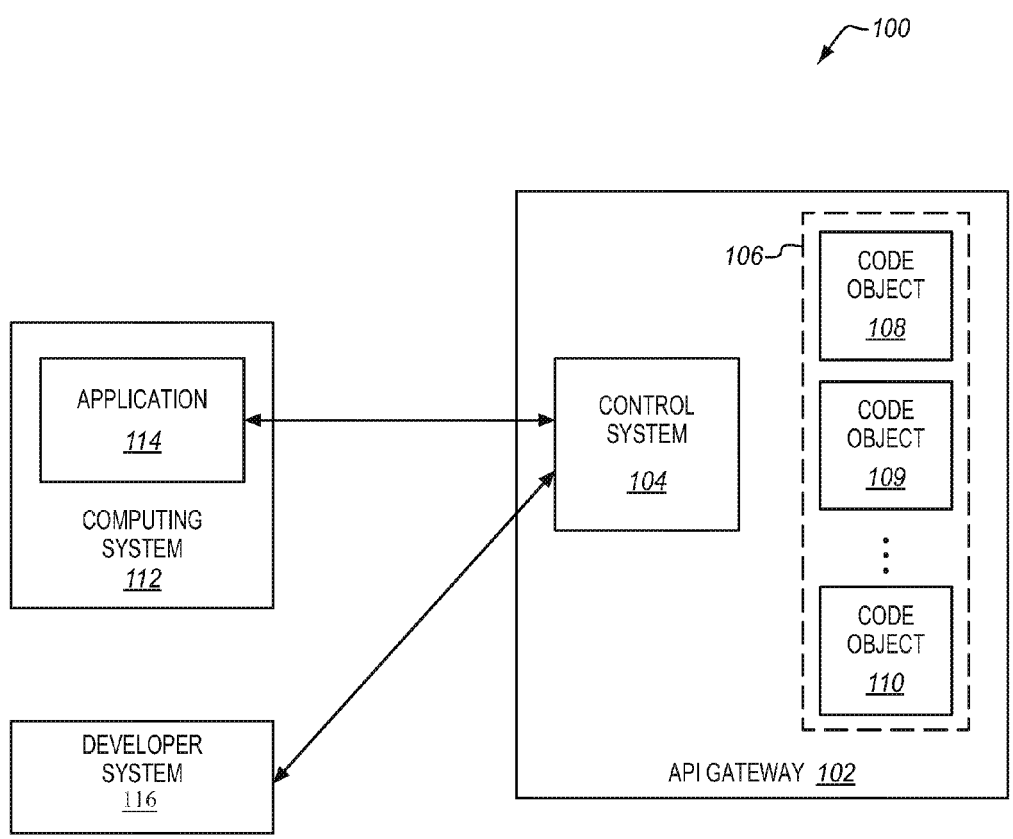
FIG. 1 is a block diagram of a system for automatically generating and publishing API information for web services, and for dynamically informing an application issuing a request for the web services that the format of the request is incorrect in an exemplary embodiment.

FIG. 1 is a block diagram of a system 100 for automatically generating and publishing API information for web services, and for dynamically informing an application issuing a request for the web services that the format of the request is incorrect in an exemplary embodiment in an exemplary embodiment.

In this embodiment, system 100 includes an API gateway 102. Generally, API gateway 102 communicates with developer system 116 to identify and deploy code objects 108-110 to implement web services. Code objects 108-110 may be stored locally in a repository 106, or stored remotely from API gateway 102. To deploy code objects 108-110, control system 104 performs a query of code objects 108-110 for functions that implement web services. For example, control system 104 may scan classes associated with code objects 108-110 to identify what functions are defined by the classes. After identifying the functions, control system 104 automatically generates and publishes APIs for the functions. This allows for a rapid deployment of web services that may be utilized nearly immediately after a new or changed code object is identified by control system 104. Thus, control system 104 includes any component, system, or device that is configured to automatically generate and publish APIs associated with code objects 108-110. In addition to automatically generating and publishing APIs, control system 104 informs remote applications when their web service requests are formatted incorrectly. Due to the rapid deployment of web services provided by control system 104, how the web services may be implemented may change over time. Thus, mechanisms exist for control system 104 to inform applications issuing web service requests for API gateway 102 that their usage of the web service is incorrect.

Ideally, application 114 executing on computing system 112 issues web service requests for API gateway 102 that are formatted correctly. This is generally the case for large static API implementations such as Google Map APIs, which do not change very often, if at all. However, smaller developers may be coding and deploying code objects 108-110 that may change over time, such as during a debugging process. When code objects 108-110 change, functions defined by code objects 108-110 may change, parameters for accessing the functions may change, etc. This may result in a change in the API specification for accessing the web services. In prior systems, incorrectly formatted web service requests may simply generate an error back to a requestor of the web services. This may be inefficient, especially within a development environment where code objects 108-110 change more often than in a large, static API implementation. Thus, control system 104 includes any component, system, or device that is configured to dynamically inform application 114 when the format of a web service request is incorrect. For instance, functions being called may not exist, parameters for the web services may be incorrect, etc. Instead of merely generating an error, control system 104 queries code objects 108-110 for information regarding a usage of functions defined by code objects 108-110, and responds to the incorrect web service request with the correct format information. Application 114 then re-formats the web service request to correct the format. This improves the efficiency of deploying web services.

In the following discussions, FIGS. 2-3 will describe embodiments for automatically generating and publishing APIs for code objects, and FIGS. 4-5 will describe embodiments for processing web service requests.

Figure 2:
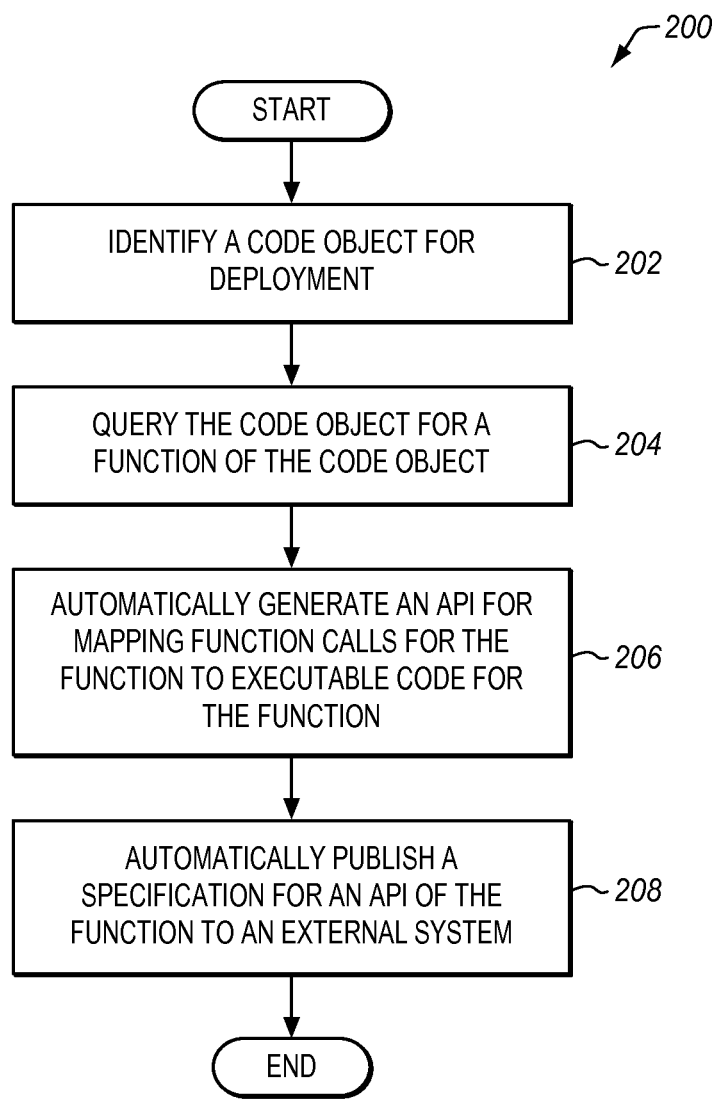
FIG. 2 is a flow chart illustrating a method of automatically generating and publishing APIs for accessing software code objects in an exemplary embodiment.

FIG. 2 is a flow chart illustrating a method 200 of automatically generating and publishing APIs for accessing software code objects in an exemplary embodiment. The steps of method 200 will be described with reference to API gateway 102 of FIG. 1, but those skilled in the art will appreciate that method 200 may be performed by other systems that are not shown. The steps of the flow charts described herein are not all inclusive and may include other steps not shown. The steps may also be performed in an alternative order.

In step 202, control system identifies a code object for deployment. For example, a software developer may utilize developer system 116 to create code object 108, and upload code object 108 to API gateway 102 or some other system. In other embodiments, an existing code object may be modified and a new version of the code object may be uploaded to API gateway 102 or some other system.

In step 204 of FIG. 2, control system 104 queries code object 108 for functions defined by, available from, etc., code object 108. Querying code object 108 may include performing a reflection process on code object 108 if the object is a Java object, scanning code object 108 to identify functions defined by classes of code object 108, etc.

In step 206, control system 104 automatically generates an API for mapping function calls for functions of code object 108 to executable code associated with the functions. Using a specification for the API, a remote system may issue function calls to the functions, whereby executable code associated with the functions is executed.

In step 208, control system 104 automatically publishes a specification of APIs of the functions to a system external to API gateway 102. One example of an external system to API gateway 102 may be computing system 112. Publishing the specification of the API functions may include posting the specification to a website on the Internet, etc.

FIG. 3 is a flow chart illustrating a method 300 of monitoring deployed software code objects for changes in an exemplary embodiment. The steps of method 300 will be described with reference to API gateway 102 of FIG. 1, but those skilled in the art will appreciate that method 300 may be performed by other systems that are not shown.

In step 302, control system 104 receives a subscriber request to monitor a code object for changes. For example, application 114 may generate a request for control system 104 to monitor changes for code object 108.

In step 304, control system 104 identifies a new version of code object 108 for deployment. For instance, a developer may access development system 116, modify code object 108, and upload a new version of code object 108 to API gateway 102 or some other system. The new version may include new functions, new arguments for existing functions, etc.

In step 306, control system 104 notifies the subscriber that a new version of code object 108 is deployed. In continuing with the example, control system 104 notifies application 114 that code object 108 has changed. By notifying a subscriber of a change to a monitored code object, the subscriber may modify its use of the code objects published by API gateway 102. For instance, application 114 may utilize new functions associated with code object 108, may modify function calls for existing functions with new arguments, etc.

In some embodiments, control system 104 may receive a subscriber request to monitor categories of web services that are deployed by API gateway 102, and be notified by API gateway 102 when new functions are deployed by API gateway 102 that correspond to the category being monitored. This allows the subscriber to make use of new functions for a particular category more efficiently.

In response to publishing a specification for the APIs associated with a code object, developers may begin issuing function calls to access the web services provided by the code objects. However, due to the rapid nature of deployment of code objects and subsequent changes that may be made to the code objects, cases may arise whereby requests for the web services may be formatted incorrectly.

FIG. 4 is a flow chart illustrating a method 400 of dynamically informing an application issuing a request for web services of a correct format of the request in an exemplary embodiment. The steps of method 400 will be described with reference to API gateway 102 of FIG. 1, but those skilled in the art will appreciate that method 400 may be performed by other systems that are not shown.

In this embodiment, assume that application 114 issues a request for a web service to API gateway 102 and that the format of the request is incorrect. The request may be formatted incorrectly for a number of reasons. The request may include incorrect parameters or usage of the parameters, the request may specify code objects that are no longer deployed by API gateway 102, the request may specify functions defined by code objects 108-110 that no longer exist, etc. The web service request may be a high level request that control system 104 maps to functions defined by multiple code objects 108-110, and/or may be a lower level request that control system 104 maps to a particular function defined by one of the code objects 108-110.

In step 402, control system 104 identifies a plurality of software code objects 108-110 (e.g., from developer system 116) for deployment. Code objects 108-110 include executable code for performing functions defined by code objects 108-110. The functions implement web services.

In step 404, control system 104 receives web service request from application 114. In step 406, control system 104 queries one or more code objects 108-110 for usage information regarding a function utilized in performing the web service. For instance, if code objects 108-110 are Java code objects, then Java reflection may be used to identify functions defined by a code object, parameters for the functions, etc.

In step 408, control system 104 determines if a format of the web service request is correct based on the query. For example, the web service request may call for a specific function within a code object. Thus, determining if the format of the web service request is correct may include determining if the function exists in the code object, and determining if the parameters for calling the function are formatted correctly in the web service request. If the request is correct, then method 400 ends. If the request is not correct, then step 410 is performed.

In step 410, control system 104 transmits a response to application 114 that specifies the correct format for the web service request. The response is based on the query performed on one or more code objects 108-110. The correct format may include information regarding which functions are available for a particular code object, which parameters are valid for a function of the code object, etc. Using the information, application 114 re-formats the web service request.

In step 412, control system 104 receives a subsequent request for the web service from application 104 that specifies the correct format. Control system 104 may then perform step 406 to query one or more code objects 108-110 for usage information, and perform step 408 to determine if the subsequent request for the web service is formatted correctly. If the subsequent request is formatted correctly, then method 400 ends.

One advantage of the system of FIG. 1 is that application 114 may dynamically re-format web service requests based on information queried from code objects 108-110 by API gateway 102. As code objects 108-110 may change over time, application 114 also changes how web service requests are submitted to API gateway 102 over time.

FIG. 5 is a flow chart illustrating another method 500 for dynamically informing application 114 issuing a request for web services of a correct format of the request in an exemplary embodiment. The steps of method 500 will be described with reference to API gateway 102 of FIG. 1, but those skilled in the art will appreciate that method 500 may be performed by other systems that are not shown. Assume for this embodiment that application 114 issues a web service request to control system 104 that identifies a specific code object and function of the code object, but the function does not exist.

In step 502, control system 104 identifies the code object based on the request. For example, the request may name a code object directly, and may name a function of the code object directly, when requesting a web service.

In step 504, control system queries code object (e.g., code object 108) for functions available from the code object. In step 506, control system 104 determines if the function from the request exists. Determining if the function exists may include comparing a named function in the web service request with functions from code object 108. If the function exists, then method 500 ends. If the function does not exist, then step 508 is performed.

In step 508, control system 104 transmits information regarding the functions of code object 108 to application 114. For instance, if the web service request is for a math function, then control system 104 may identify code object 108 as the target of the request. Control system 104 may then query code object 108 for functions, and transmit the information to application 114. By providing the functions that are available from the requested code object back to application 114, application 114 may then reformat the web service request and transmit a new request for the web service to API gateway 102. In step 510, control system 104 receives the subsequent request for the web service from application 114 that specifies a function defined by, for example, code object 108.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the invention is not limited to those specific embodiments. The scope of the invention is defined by the following claims and any equivalents thereof.

I claim:

1. A system comprising:
an Application Programming Interface (API) gateway configured to identify a plurality of software code objects for deployment, wherein the code objects include executable code for performing functions to implement web services;
the API gateway further configured to receive a request for a web service from an application, to query at least one code object for usage information regarding at least one function utilized in performing the web service, and to determine that a format of the web service request is incorrect based on the query for the usage information;
the API gateway further configured to transmit a response to the application that specifies a correct format of the web service request based on the query, and to receive a subsequent request for the web service from the application that specifies the correct format;
the API gateway is further configured to receive a request from a subscriber to monitor a category of web services that are available based on code objects deployed by the API gateway, to deploy a new code object for the category, and to notify the subscriber that the new code object for the category is deployed.

2. The system of claim 1 wherein:
the API gateway further configured to receive a code object for deployment, to query the code object for at least one function, to automatically generate an API for mapping function calls for the at least one function to the executable code for performing the at least one function, and to publish a specification for the API of the at least one function to a system external to the API gateway.

3. The system of claim 1 wherein:
the API gateway is further configured to identify a code object based on the web service request, to query the code object for functions of the code object, and to determine that a function specified in the web service request does not exist in the code object; and the API gateway is further configured to transmit information regarding the functions of the code object to the application, and to receive a subsequent request for the web service from the application that specifies a function of the code object.

4. The system of claim 1 wherein:
the API gateway is further configured to identify a function for a code object based on the web service request, to query the code object for arguments of the function, and to determine that a format of the web service request is incorrect based on the query for the arguments of the function; and
the API gateway is further configured to transmit information regarding the arguments of the function to the application, and to receive the subsequent request for the web service from the application that specifies the arguments of the function.

5. The system of claim 1 wherein:
the API gateway is further configured to receive a request for information regarding functions of a code object from the application, to query the code object for functions of the code object, and to transmit information regarding the functions of the code object to the application.

6. The system of claim 1 wherein:
the API gateway is further configured to receive a request for information regarding arguments for the function from the application, to query the code object for arguments for the function, and to transmit information regarding the arguments for the function to the application.

7. The system of claim 1 wherein:
the API gateway is further configured to receive a subscriber request to monitor a code object for changes, to receive a new version of the code object for deployment, and to notify the subscriber that a new version of the code object is deployed.

8. A method comprising:
identifying a plurality of software code objects for deployment, wherein the code objects include executable code for performing functions to implement web services;
receiving a request for a web service from an application;
querying at least one code object for usage information regarding at least one function utilized in performing the web service;
determining that a format of the web service request is incorrect based on the query for the usage information;
transmitting a response to the application that specifies a correct format of the web service request based on the query;
receiving a subsequent request for the web service from the application that specifies the correct format;
receiving a request from a subscriber to monitor a category of web services that are available based on code objects that are deployed;
deploying a new code object for the category; and notifying the subscriber that the new code object for the category is deployed.

9. The method of claim 8 further comprising:
receiving a code object for deployment by an API gateway;
querying the code object for at least one function of the code object;
automatically generate an API for mapping function calls for the at least one function to the executable code for performing the at least one function;
publishing a specification for the API of the at least one function to a system external to the API gateway.

10. The method of claim 8 wherein:
the method further comprises:
identifying a code object based on the request;
querying the at least one code object further comprises:
querying the code object for functions of the code object;
determining that the format of the web service request is incorrect further comprises:
determining that a function specified in the web service request does not exist in the code object;
transmitting the response further comprises:
transmitting information regarding the functions of the code object to the application; and
receiving the subsequent request further comprises:
receiving a subsequent request for the web service from the application that specifies a function of the code object.

11. The method of claim 8 wherein:
the method further comprises:
identifying a function for a code object based on the request;
querying the at least one code object further comprises:
querying the code object for arguments of the function;
determining that the format of the web service request is incorrect further comprises:
determining that the format of the web service request is incorrect based on the query for the arguments of the function;
transmitting the response further comprises:
transmitting information regarding the arguments of the function to the application; and
receiving the subsequent request further comprises:
receiving the subsequent request for the web service from the application that specifies the arguments of the function.

12. The method of claim 8 further comprising:
receiving a request for information regarding functions of a code object from the application;
querying the code object for functions of the code object; and
transmitting information regarding the functions of the code object to the application.

13. The method of claim 8 further comprising:
receiving a request for information regarding arguments for the function from the application;
querying the code object for arguments for the function; and
transmitting information regarding the arguments for the function to the application.

14. The method of claim 8 further comprising:
receiving a request from a subscriber to monitor a code object for changes;
receiving a new version of the code object for deployment; and
notifying the subscriber that a new version of the code object is deployed.

* * * * *